United States Patent
Lee et al.

(10) Patent No.: US 7,231,539 B1
(45) Date of Patent: Jun. 12, 2007

(54) RESET CIRCUIT FOR RESETTING TWO CLOCK DOMAINS

(75) Inventors: Meng-Kun Lee, Cupertino, CA (US); Peter Z. Onufryk, Flanders, NJ (US)

(73) Assignee: Integrated Device Technology, Inc., San Jose, CA (US)

( * ) Notice: Subject to any disclaimer, the term of this patent is extended or adjusted under 35 U.S.C. 154(b) by 392 days.

(21) Appl. No.: 10/885,922

(22) Filed: Jul. 7, 2004

Related U.S. Application Data (60) Provisional application No. 60/576,881, filed on Jun. 3, 2004.

(51) Int. Cl.
*G06F 1/04* (2006.01)
(52) U.S. Cl. ...................................................... 713/600
(58) Field of Classification Search ................. 713/600
See application file for complete search history.

(56) References Cited

U.S. PATENT DOCUMENTS

| | | | | |
|---|---|---|---|---|
| 6,055,285 A | * | 4/2000 | Alston | 375/372 |
| 6,370,644 B1 | * | 4/2002 | LaBerge | 713/1 |
| 6,586,969 B1 | * | 7/2003 | Koe | 326/93 |
| 6,748,039 B1 | * | 6/2004 | Bates | 375/354 |

* cited by examiner

*Primary Examiner*—Rehana Perveen
*Assistant Examiner*—Eric Chang
(74) *Attorney, Agent, or Firm*—Glass & Associates; Kenneth Glass (57) ABSTRACT

A reset circuit for resetting two clock domains resets the two clock domains synchronously with a first clock signal in response to assertion of a system reset. It then de-asserts the resetting of a first of the clock domains in synchronization with the first clock signal, and de-asserts the resetting of a second of the clock domains in synchronization with a second clock signal so that the second clock domain is not operative until after the second clock signal is running.

27 Claims, 6 Drawing Sheets fig.1 fig.2 fig.3 fig.5 fig.4 fig.6 fig.7

RESET CIRCUIT FOR RESETTING TWO CLOCK DOMAINS

CROSS REFERENCE TO RELATED APPLICATIONS

This application claims priority to U.S. provisional application Ser. No. 60/576,881 filed Jun. 3, 2004 and incorporated herein by reference.

FIELD OF THE INVENTION

The present invention generally relates to techniques for resetting circuits and in particular, to a reset circuit for resetting two clock domains.

BACKGROUND OF THE INVENTION

A peripheral interface (such as an ATM interface) is employed in a computer system to interface communications between core logic of the computer system and an external peripheral device (such as a physical layer device or "PHY" in the case of ATM). Since the core logic uses a system clock and the peripheral device uses a peripheral clock (that is generally asynchronous to and of lower frequency than the system clock), the circuitry of the peripheral interface is separated into two clock domains, i.e., a system clock domain and a peripheral clock domain.

The system clock domain includes portions of the interface using the system clock to communicate with the core logic, and the peripheral clock domain includes portions of the interface using the peripheral clock to communicate with the peripheral device. The system clock is provided to the system clock domain internally by a system clock generator, and the peripheral clock is provided to the peripheral clock domain externally by the peripheral device.

When the system resets the peripheral device, it is desirable to be able to synchronously reset both clock domains even if the peripheral clock is not being provided at that time to the peripheral clock domain. It is also desirable to hold the reset on the peripheral clock domain until the peripheral clock is being provided once again by the peripheral device. Further, when the peripheral clock is once again being provided and the reset is released on the peripheral clock domain, it is desirable to perform that release synchronously with the peripheral clock (which is generally asynchronous to the system clock).

To circumvent the need to meet these objectives, some computer systems simply require the peripheral clock to always be provided externally by the peripheral during reset. This, however, may not always be possible or desirable. For example, a PHY may not generate the peripheral clock until it has been enabled by the core logic.

In a software approach that attempts to meet the above objectives, a status bit is set when the peripheral device has been reset. The challenge with the status bit approach is that if the peripheral clock signal is stopped, the status bit will remain in the "not reset" state for an indefinite period. Proper handling of this condition therefore requires complex software.

OBJECTS AND SUMMARY OF THE INVENTION

Accordingly, one object of the present invention is to provide a reset circuit for resetting two clock domains that does not require both clock signals for the two clock domains to be running at the time of the reset.

Another object is to provide a reset circuit for resetting two clock domains that does not require use of a status bit for indicating when a peripheral device has been reset.

Other objects include providing a peripheral controller interface including such a reset circuit for resetting two clock domains, and a computer system including such a peripheral controller interface.

The proposed invention, described below, meets the above objectives so as to allow peripheral devices and their interfaces to be cleanly reset even in the absence of a peripheral clock and without the need for complex software.

These and other objects are accomplished by the various aspects of the present invention, wherein briefly stated, one aspect is a reset circuit for resetting two clock domains, comprising: first logic responsive to a reset signal to assert a first reset to a first of two clock domains synchronously with a first clock signal; and second logic coupled to the first logic to de-assert the first reset synchronously with a second clock signal.

Another aspect is a peripheral controller interface comprising: a system clock domain, a peripheral clock domain, and a reset circuit. The system clock domain is coupled to a system bus, and is clocked by a system clock signal provided on the system bus. The peripheral clock domain is coupled to the system clock domain and a peripheral device, and is clocked by a peripheral clock signal provided by the peripheral device. The reset circuit is responsive to a reset signal to assert a first reset to the peripheral clock domain synchronously with the system clock signal, and de-assert the first reset synchronously with the peripheral clock signal so that the first reset is not de-asserted unless the peripheral clock signal is running, and assert and de-assert a second reset to the system clock domain synchronously with the system clock signal.

Still another aspect is a computer system comprising: a central processing unit; a peripheral device; and a peripheral controller interface coupled to the central processing unit through a system bus and the peripheral device through a peripheral interface. The peripheral controller interface includes a system clock domain clocked by a system clock signal provided on the system bus, a peripheral clock domain clocked by a peripheral clock signal provided by the peripheral interface, and a reset circuit responsive to a reset signal to assert a first reset to the peripheral clock domain synchronously with the system clock signal, and de-assert the first reset synchronously with the peripheral clock signal so that the first reset is not de-asserted unless the peripheral clock signal is running, and assert and de-assert a second reset to the system clock domain synchronously with the system clock signal.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
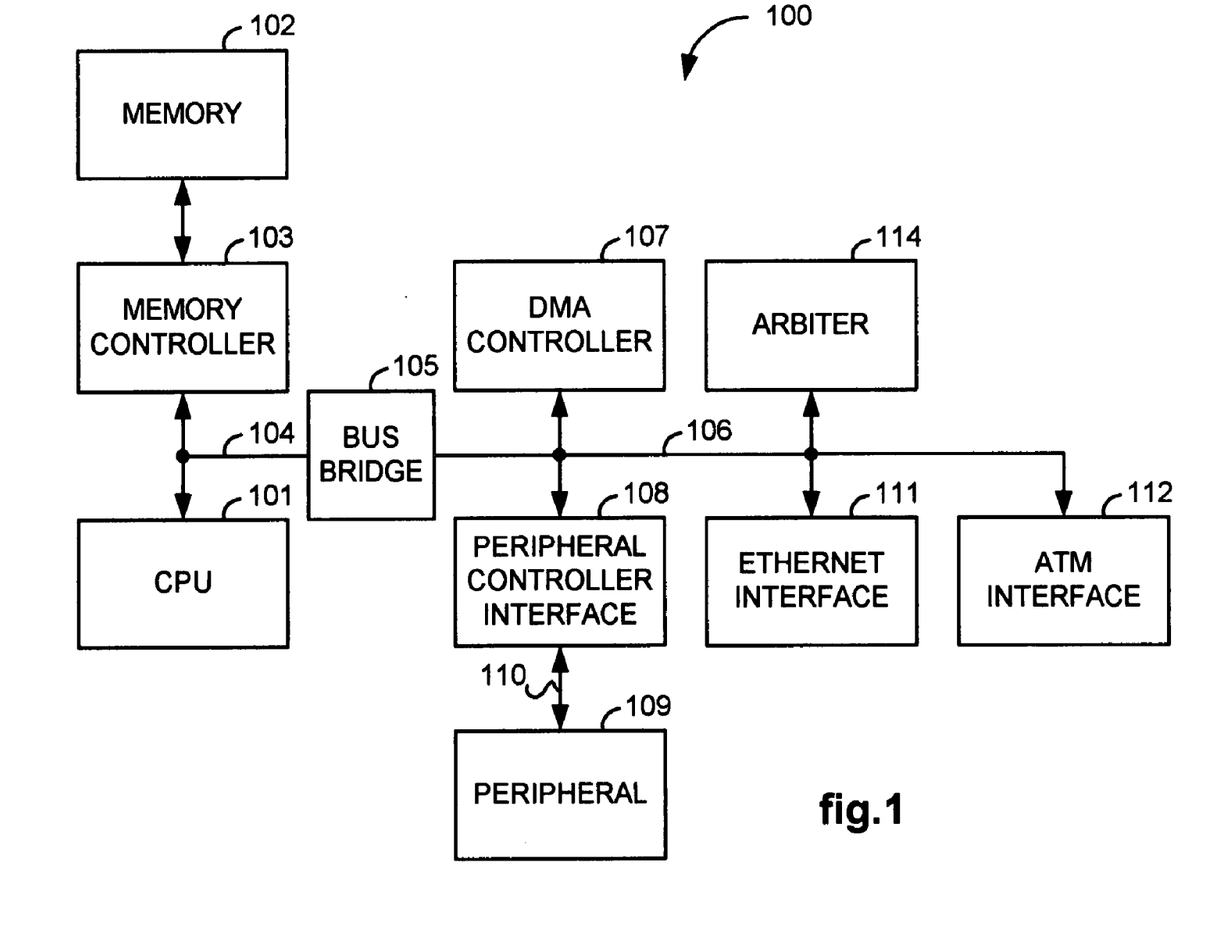
FIG. 1 illustrates a block diagram of a computer system, utilizing aspects of the present invention.

FIG. 1 illustrates, as an example, a block diagram of a computer system 100. A system memory 102 is conventionally coupled to a central processing unit ("CPU") 101 through a memory controller 103 and a CPU Bus 104, and a peripheral device 109 is conventionally coupled to a system bus 106 through a peripheral controller interface 108. A bus bridge 105 conventionally bridges communications between the CPU bus 104 and the system bus 106. A DMA controller 107 conventionally manages DMA transfers between the system memory 102 and devices coupled to the peripheral controller interface 108, the Ethernet interface 111 and the ATM interface 112. An arbiter 114 conventionally arbitrates and grants requests to access the system bus 106.

In the following description, a reset circuit for resetting two clock domains is described as being included in the peripheral controller interface 108. However, it is to be appreciated that the reset circuit of the present invention can also be included in the Ethernet interface 111, ATM interface 112, and/or other interface that may be implemented in the computer system 100.

Figure 2:
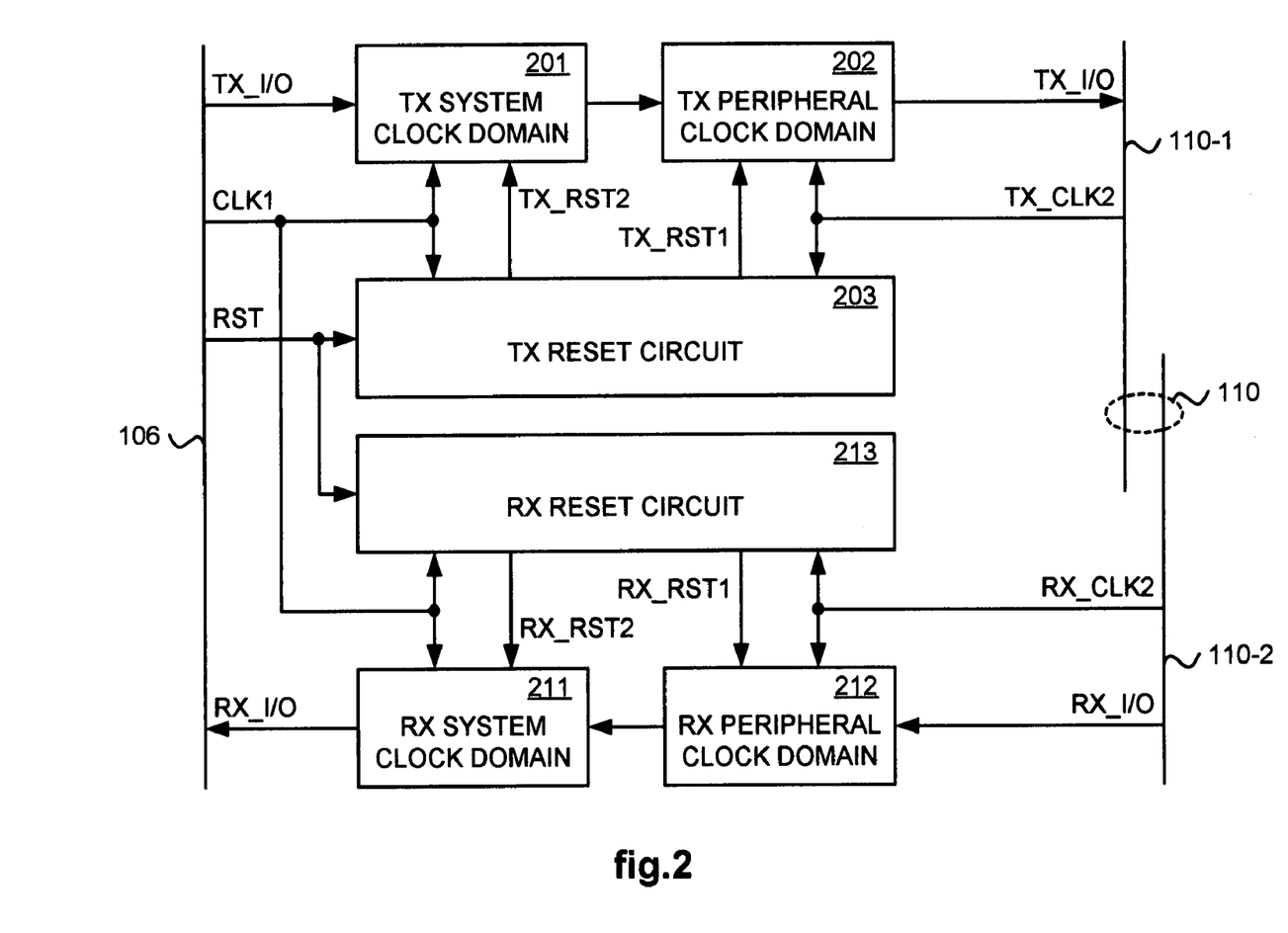
FIG. 2 illustrates a block diagram of a peripheral controller interface, utilizing aspects of the present invention.

FIG. 2 illustrates, as an example, a block diagram of the peripheral controller interface 108. The peripheral controller interface 108 includes transmit ("TX") circuitry for communications going from the system bus 106 to the peripheral device 109, and receive ("RX") circuitry for communications coming from the peripheral device 109 to the system bus 106. In addition, the peripheral interface 110 includes a TX peripheral interface 110-1 for communications going from the system bus 106 to the peripheral device 109, and a RX peripheral interface 110-2 for communications coming from the peripheral device 109 to the system bus 106.

The transmit circuitry is a two clock domain circuit which includes TX system clock domain logic 201, TX peripheral clock domain logic 202, and TX reset circuit 203. The TX system clock domain logic 201 is coupled to the system bus 106 and responsive to a system clock signal CLK1 provided by the system bus 106 in order to interface with the system bus 106. The TX peripheral clock domain logic 202 is coupled to the TX system clock domain logic 201 on one side, and the TX peripheral interface 110-1 on the other side. It is responsive to a TX peripheral clock signal TX_CLK2 which is provided through the TX peripheral interface 110-1 in order to interface with the TX peripheral interface 110-1.

The TX system clock domain logic 201 receives communications TX_I/O from the system bus 106 in synchronization with the system clock signal CLK1, and the TX peripheral clock domain logic 202 transmits those communications to the TX peripheral interface 110-1 in synchronization with the TX peripheral clock signal TX_CLK2. The TX reset circuit 203 resets the two clock domains 201 and 202 by asserting reset signals TX_RST2 and TX_RST1 respectively provided to the TX system clock domain logic 201 and the TX peripheral clock domain logic 202 synchronously with the system clock signal CLK1 so that they are reset even if the TX peripheral clock signal TX_CLK2 is not running at the time. On the other hand, The TX reset circuit 203 de-asserts the reset signal TX_RST2 synchronously with the system clock signal CLK1, and de-asserts the reset signal TX_RST1 synchronously with the TX peripheral clock signal TX_CLK2 so that de-assertion of the reset signal TX_RST1 only takes place if the TX peripheral clock signal TX_CLK2 is running.

The receive circuitry is also a two clock domain circuit which includes RX system clock domain logic 211, RX peripheral clock domain logic 212, and RX reset circuit 213. The RX system clock domain logic 211 is coupled to the system bus 106 and responsive to a system clock signal CLK1 provided by the system bus 106 in order to interface with the system bus 106. The RX peripheral clock domain logic 212 is coupled to the RX system clock domain logic 211 on one side, and the RX peripheral interface 110-2 on the other side. It is responsive to a RX peripheral clock signal RX_CLK2 which is provided through the RX peripheral interface 110-2 in order to interface with the RX peripheral interface 110-2.

The RX peripheral clock domain logic 212 receives communications RX_I/O from the RX peripheral interface 110-2 in synchronization with the RX peripheral clock signal RX_CLK2, and the RX system clock domain logic 211 transmits those communications to the system bus 106 in synchronization with the system clock signal CLK1. The RX reset circuit 213 resets the two clock domains 211 and 212 by asserting reset signals RX_RST2 and RX_RST1 which are respectively provided to the RX system clock domain logic 211 and the RX peripheral clock domain logic 212 synchronously with the system clock signal CLK1 so that they are reset even if the RX peripheral clock signal RX_CLK2 is not running at the time. On the other hand, The RX reset circuit 213 de-asserts the reset signal RX_RST2 synchronously with the system clock signal CLK1, and de-asserts the reset signal RX_RST1 synchronously with the RX peripheral clock signal RX_CLK2 so that de-assertion of the reset signal RX_RST1 only takes place if the RX peripheral clock signal RX_CLK2 is running.

In the present example, a single reset signal RST is provided to the TX reset circuit 203 and the RX reset circuit 213 in order to reset both at the same time. Even though they may be reset at the same time, however, de-assertion of the reset may occur at different times. This is because each has its own peripheral clock signal, and de-assertion requires the peripheral clock signal to be running at the time.

In another example (not shown), separate reset signals may be provided to individually reset the TX and RX circuitry. Thus, resetting of either the TX or RX circuitry in such case could occur completely independently of one another.

Figure 3:
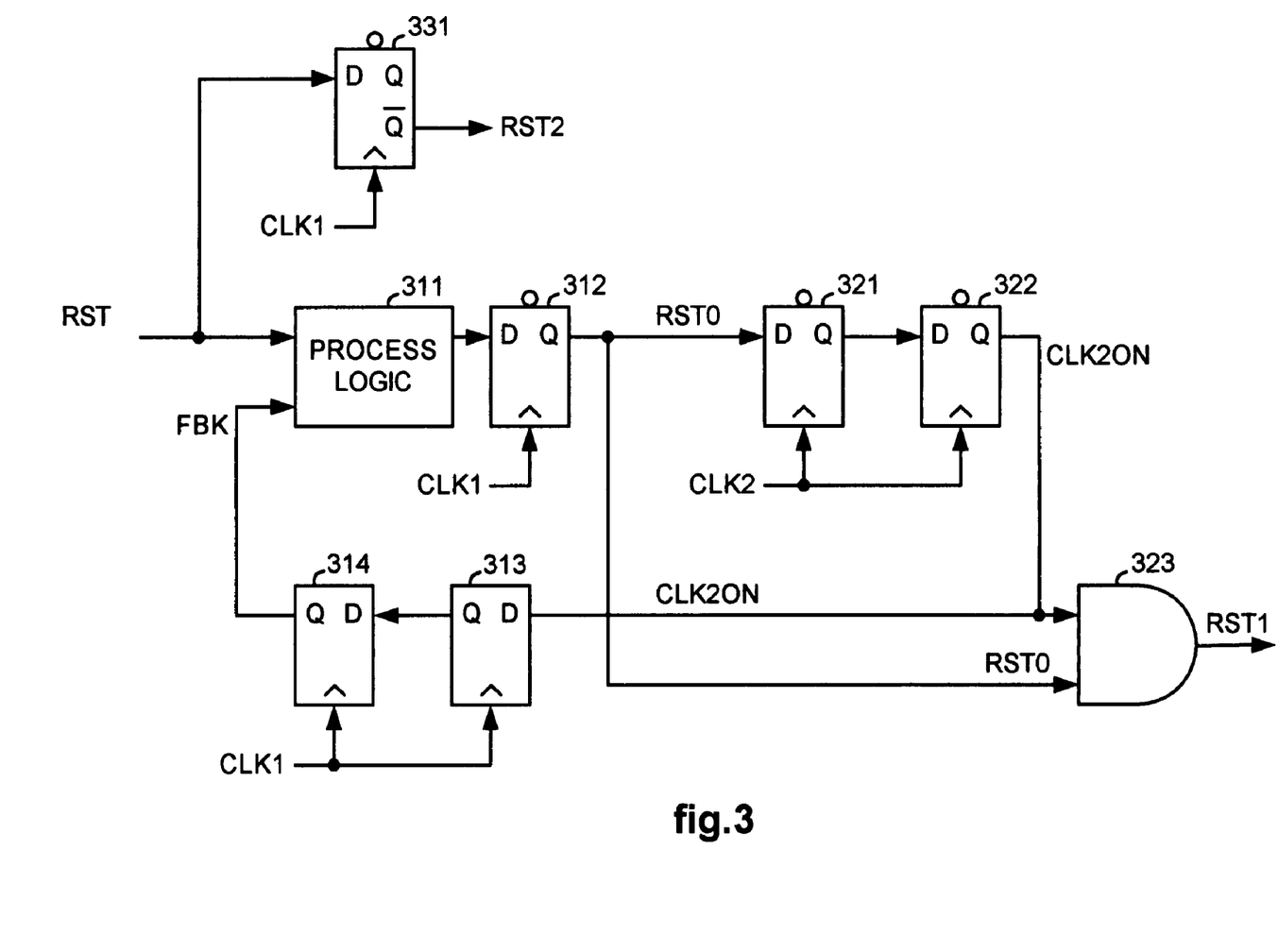
FIG. 3 illustrates a logic diagram of a reset circuit for resetting two clock domains, utilizing aspects of the present invention.

FIG. 3 illustrates, as an example, a reset circuit for resetting two clock domains that may be used for either the TX reset circuit 203 or the RX reset circuit 213. Although the following describes operation of the TX reset circuit 203, it is to be appreciated that aspects of the description are also applicable to the operation of the RX reset circuit 213.

Figure 4:
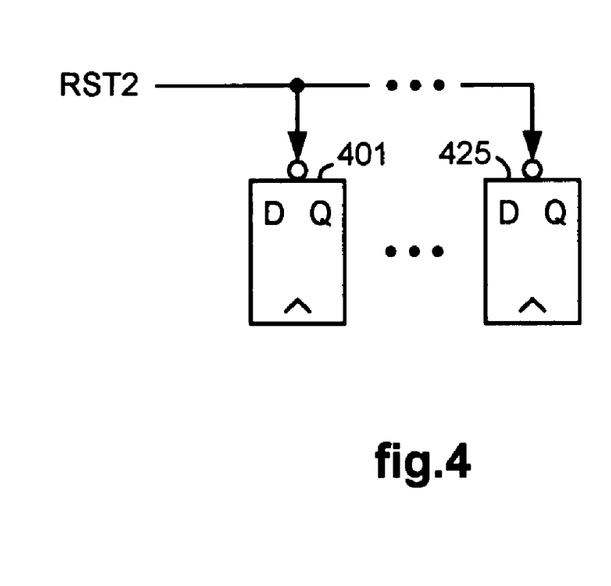
FIGS. 4 and 5 respectively illustrate a system clock domain and a peripheral clock domain included in the peripheral controller interface utilizing aspects of the present invention.
Figure 5:
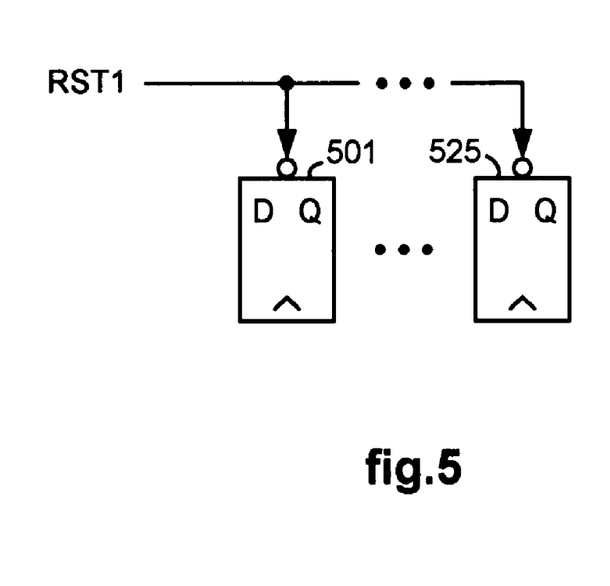

By convention, RST0, RST1, CLK2ON, FBK and RST2 are all initially at logical 1 so that logic (represented by flip-flops such as 401~425 of FIG. 4) in the TX system clock domain 201 and logic (represented by flip-flops such as 501~525 of FIG. 5) in the TX peripheral clock domain 202 are not reset. Such initialization may be performed by resetting the peripheral controller interface 108 as described herein with both the system clock signal CLK1 and the peripheral clock signal CLK2 running, or it may be performed using conventional reset circuitry (not shown) that does not require the peripheral clock signal CLK2 to be present at the time.

A reset RST signal provided to process logic 311 is then asserted by, for example, software running in the computer system 100 to initiate a reset of the peripheral controller interface 108. In response, the process logic 311 provides a logical 0 to the D-input of flip-flop 312.

On the next falling edge of the system clock signal CLK1, the output RST0 of the flip-flop 312 follows by also going to a logical 0. As a consequence, the output RST1 of the AND gate 323 goes to a logical 0 and the logic (e.g., flip-flops 501~525 of FIG. 5) in the TX peripheral clock domain 202 are reset at this time. Note that the resetting of this logic is synchronous with the system clock CLK1, not with the peripheral clock CLK2.

In addition to being coupled to an input of the AND gate 323, the output RST0 is also coupled to an input of flip-flop 321. When the peripheral clock CLK2 is running, the state of RST0 is passed to the output of flip-flop 321 on a next falling edge of the peripheral clock signal CLK2, and then passed to the output CLK20N of flip-flop 322 on a subsequent falling edge of the peripheral clock signal CLK2 so that the output CLK20N goes from a logical 1 to a logical 0 at that time. Note that the two back-to-back flip-flops are used here instead of just one flip-flop, to avoid metastability problems.

CLK20N is coupled to an input of the AND gate 323 and to an input of flip-flop 313. The state of CLK20N is passed to the output of flip-flop 313 on a next falling edge of the system clock signal CLK1, and then passed to the output FBK of flip-flop 314 on a subsequent falling edge of the system clock signal CLK1 so that the output FBK goes from a logical 1 to a logical 0 at that time. Note that the two back-to-back flip-flops are used here instead of just one flip-flop, to again avoid metastability problems.

The process logic 311 then responds to the output FBK going to logical 0 by providing a logical 1 to the flip-flop 312. This does not change the output RST1 of the AND gate 323 at this time, however, because the output CLK20N being provided as another input to the AND gate 323 is still in a logical 0 state.

The state of RST0 is passed to the output of flip-flop 321 on a next falling edge of the peripheral clock signal CLK2, and then passed to the output CLK20N of flip-flop 322 on a subsequent falling edge of the peripheral clock signal CLK2 so that the output CLK20N and consequently, the output of the AND gate 323 goes from a logical 0 to a logical 1 at that time so as to no longer assert a reset on the logic in the TX peripheral clock domain 202.

Figure 6:
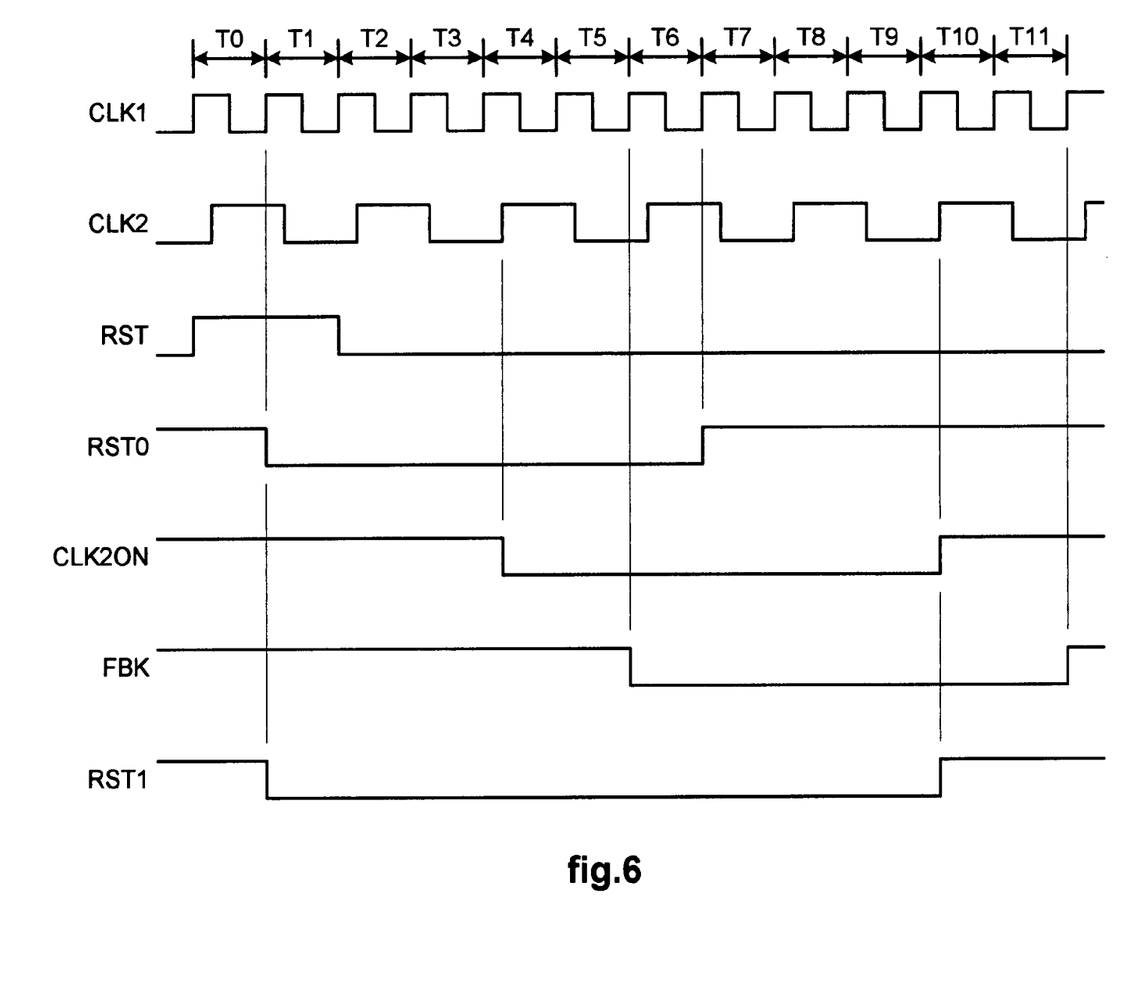
FIG. 6 illustrates a timing diagram for the reset circuit with the peripheral clock running at the time of reset, utilizing aspects of the present invention.
Figure 7:
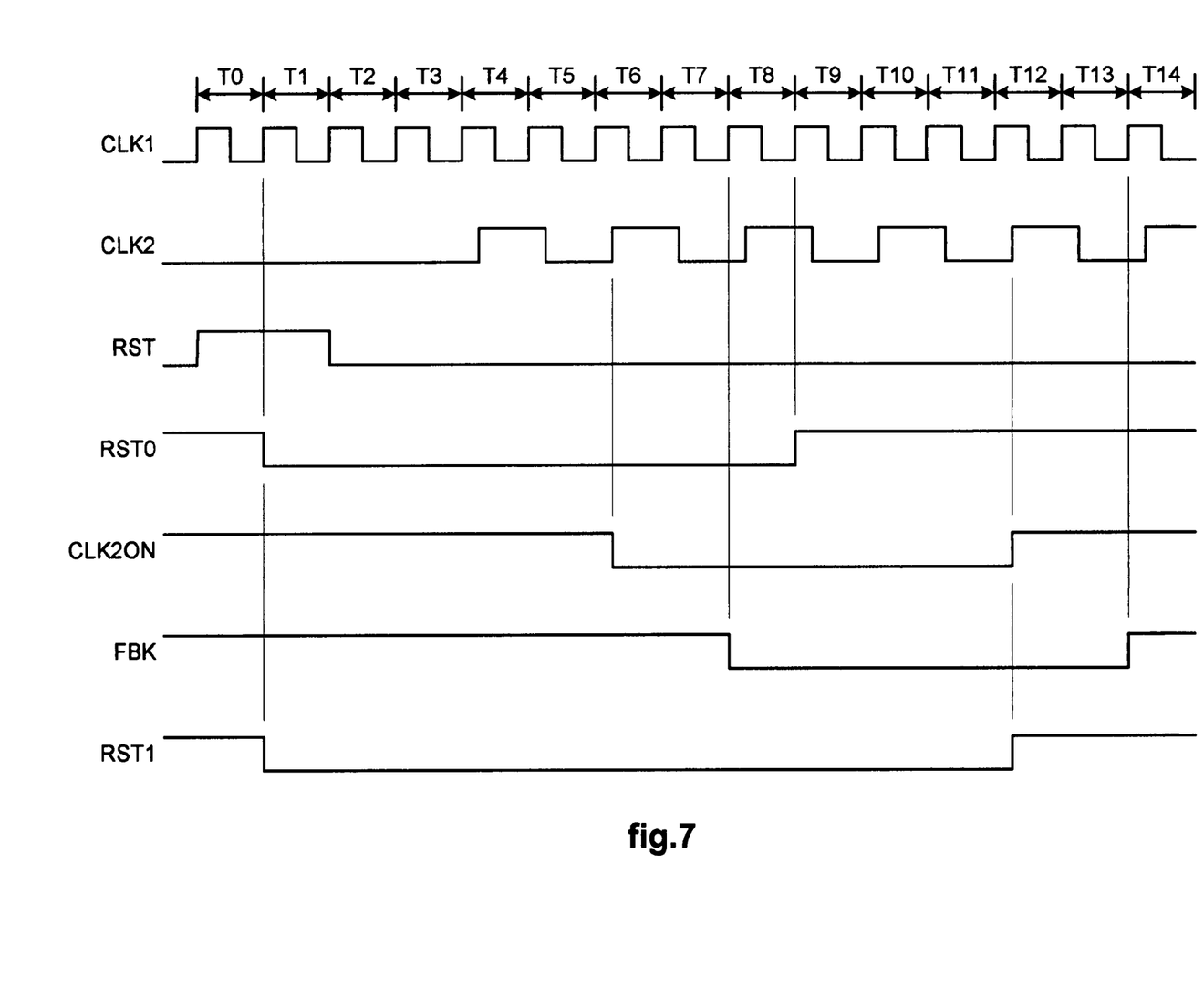
FIG. 7 illustrates a timing diagram for the reset circuit with the peripheral clock not running at the time of reset, utilizing aspects of the present invention.

FIGS. 6 and 7 illustrate, as examples, timing diagrams corresponding to the reset circuit of FIG. 3. In FIG. 6, the peripheral clock signal CLK2 is running throughout the reset process. In FIG. 7, the peripheral clock signal CLK2 starts running at a later time (within T4 of the system clock signal CLK1), thus delaying the de-assertion of the reset signal RST1 for a comparable period of time. Note that de-assertion of the reset signal RST1 does not occur until some time after the peripheral clock signal CLK2 starts running (i.e., four clock cycles of the peripheral clock signal CLK2 and 3 clock cycles of the system clock signal CLK1).

Assertion and de-assertion of the reset signal RST2 provided to the TX system clock domain 201 is performed simply by, for example, passing the state of the reset signal RST through a flip-flop 331 clocked by the system clock signal CLK1.

After de-asserting the reset signal RST1, the peripheral controller interface 108 is free to operate again. Note that before the peripheral clock signal CLK2 starts running, the logic in TX system clock domain 201 already works functionally and is not affected by the absence of the peripheral clock CLK2. All output ports of the interface are reset at the same time as the logic in the TX peripheral clock domain 202 so as to prevent confusion on the peripheral interface 110 during the reset process.

As is apparent from the above description of the TX reset circuit 203, it is an aspect of the invention to hold (i.e., memorize) the state of reset until the peripheral clock signal CLK2 is back on running so all logic in the TX peripheral clock domain 202 will be reset properly.

Although the various aspects of the present invention have been described with respect to a preferred embodiment, it will be understood that the invention is entitled to full protection within the full scope of the appended claims.

We claim:

1. A reset circuit for resetting two clock domains, comprising:
    first logic responsive to a reset signal to assert a first reset to a first of two clock domains synchronously with a first clock signal, the first logic including a first flip-flop having an input coupled to the reset signal and a clock input coupled to the first clock signal, and the first logic including an AND gate having a first input coupled to an output of the first flip-flop and an output providing the first reset; and
    second logic coupled to the first logic to de-assert the first reset synchronously with a second clock signal.

2. The reset circuit according to claim 1, further comprising: third logic responsive to the reset signal to assert and de-assert a second reset to a second of the two clock domains synchronously with the first clock signal.

3. The reset circuit according to claim 1, wherein the first logic further comprises: process logic having a first input coupled to the reset signal, and an output coupled to the input of the first flip-flop.

4. The reset circuit according to claim 3, wherein the second logic comprises:
    second clock domain latch circuit having an input coupled to the output of the first flip-flop, an output coupled to a second input of the AND gate, and latch enable coupled to the second clock signal; and
    first clock domain latch circuit having an input coupled to the output of the second clock domain latch circuit, an output coupled to a second input of the process logic, and latch enable coupled to the first clock signal;
    wherein the state of the process logic output changes each time the process logic first input and the process logic second input change state on an alternating basis.

5. The reset circuit according to claim 4, wherein the second clock domain latch comprises:
    second flip-flop having an input serving as the input of the second clock domain latch, and a clock input coupled to the second clock signal; and
    third flip-flop having an input coupled to an output of the second flip-flop, an output serving as the output of the second clock domain latch, and a clock input coupled to the second clock signal.

6. The reset circuit according to claim 5, wherein the first clock domain latch comprises:
fourth flip-flop having an input serving as the input of the first clock domain latch, and a clock input coupled to the first clock signal; and
fifth flip-flop having an input coupled to an output of the fourth flip-flop, an output serving as the output of the first clock domain latch, and a clock input coupled to the first clock signal.

7. The reset circuit according to claim 4, wherein the outputs of the process logic, the first flip-flop, the second clock domain latch, the AND gate, and the first clock domain latch are initially in an opposite state than the reset signal before the reset signal is asserted.

8. The reset circuit according to claim 7, wherein the output of the process logic changes state in response to the reset signal being asserted.

9. The reset circuit according to claim 8, wherein the output of the process logic changes state to a first state in response to the reset signal being asserted, and changes state to a second state in response to the output of the first clock domain latch changing state from an initial state which it is in prior to the reset signal being asserted.

10. A peripheral controller interface comprising:
system clock domain coupled to a system bus, wherein the system clock domain is clocked by a system clock signal provided on the system bus;
peripheral clock domain coupled to the system clock domain and a peripheral device, wherein the peripheral clock domain is clocked by a peripheral clock signal provided by the peripheral device; and
reset circuit including first logic responsive to a reset signal to assert a first reset to the peripheral clock domain synchronously with the system clock signal, the first logic including a first flip-flop having an input coupled to the reset signal and a clock input coupled to the system clock signal, and the first logic including an AND gate having a first input coupled to an output of the first flip-flop and an output providing the first reset, the reset circuit including second logic coupled to the first logic to de-assert the first reset synchronously with the peripheral clock signal so that the first reset is not de-asserted unless the peripheral clock signal is running, and assert and de-assert a second reset to the system clock domain synchronously with the system clock signal.

11. The peripheral controller interface according to claim 10, further comprising: third logic responsive to the reset signal to assert and de-assert the second reset synchronously with the system clock signal.

12. The peripheral controller interface according to claim 10, wherein the first logic further comprises: process logic having a first input coupled to the reset signal, and an output coupled to the input of the first flip-flop.

13. The peripheral controller interface according to claim 12, wherein the second logic comprises:
peripheral clock domain latch circuit having an input coupled to the output of the first flip-flop, an output coupled to a second input of the AND gate, and latch enable coupled to the peripheral clock signal; and
system clock domain latch circuit having an input coupled to the output of the peripheral clock domain latch circuit, an output coupled to a second input of the process logic, and latch enable coupled to the system clock signal;
wherein the state of the process logic output changes each time the process logic first input and the process logic second input change state on an alternating basis.

14. The peripheral controller interface according to claim 13, wherein the peripheral clock domain latch comprises:
second flip-flop having an input serving as the input of the peripheral clock domain latch, and a clock input coupled to the peripheral clock signal; and
third flip-flop having an input coupled to an output of the second flip-flop, an output serving as the output of the peripheral clock domain latch, and a clock input coupled to the peripheral clock signal.

15. The peripheral controller interface according to claim 14, wherein the system clock domain latch comprises:
fourth flip-flop having an input serving as the input of the system clock domain latch, and a clock input coupled to the system clock signal; and
fifth flip-flop having an input coupled to an output of the fourth flip-flop, an output serving as the output of the system clock domain latch, and a clock input coupled to the system clock signal.

16. The peripheral controller interface according to claim 15, wherein the outputs of the process logic, the first flip-flop, the peripheral clock domain latch, the AND gate, and the system clock domain latch are initially in an opposite state than the reset signal before the reset signal is asserted.

17. The peripheral controller interface according to claim 16, wherein the output of the process logic changes state in response to the reset signal being asserted.

18. The peripheral controller interface according to claim 17, wherein the output of the process logic changes state to a first state in response to the reset signal being asserted, and changes state to a second state in response to the output of the system clock domain latch changing state from an initial state which it is in prior to the reset signal being asserted.

19. A computer system comprising:
central processing unit;
peripheral device; and
peripheral controller interface coupled to the central processing unit through a system bus and the peripheral device through a peripheral interface, wherein the peripheral controller interface includes a system clock domain clocked by a system clock signal provided on the system bus, a peripheral clock domain clocked by a peripheral clock signal provided by the peripheral interface, and a reset circuit including first logic responsive to a reset signal to assert a first reset to the peripheral clock domain synchronously with the system clock signal, the first logic including a first flip-flop having an input coupled to the reset signal and a clock input coupled to the system clock signal, and the first logic including an AND gate having a first input coupled to an output of the first flip-flop and an output providing the first reset, the reset circuit including second logic to de-assert the first reset synchronously with the peripheral clock signal so that the first reset is not de-asserted unless the peripheral clock signal is running, and assert and de-assert a second reset to the system clock domain synchronously with the system clock signal.

20. The computer system according to claim 19, wherein the reset circuit further comprises: third logic responsive to the reset signal to assert and de-assert the second reset synchronously with the system clock signal.

21. The computer system according to claim 19, wherein the first logic further comprises: process logic having a first input coupled to the reset signal, and an output coupled to the input of the first flip-flop.

22. The computer system according to claim 21, wherein the second logic comprises:
   peripheral clock domain latch circuit having an input coupled to the output of the first flip-flop, an output coupled to a second input of the AND gate, and latch enable coupled to the peripheral clock signal; and
   system clock domain latch circuit having an input coupled to the output of the peripheral clock domain latch circuit, an output coupled to a second input of the process logic, and latch enable coupled to the system clock signal;
   wherein the state of the process logic output changes each time the process logic first input and the process logic second input change state on an alternating basis.

23. The computer system according to claim 22, wherein the peripheral clock domain latch comprises:
   second flip-flop having an input serving as the input of the peripheral clock domain latch, and a clock input coupled to the peripheral clock signal; and
   third flip-flop having an input coupled to an output of the second flip-flop, an output serving as the output of the peripheral clock domain latch, and a clock input coupled to the peripheral clock signal.

24. The computer system according to claim 23, wherein the system clock domain latch comprises:
   fourth flip-flop having an input serving as the input of the system clock domain latch, and a clock input coupled to the system clock signal; and
   fifth flip-flop having an input coupled to an output of the fourth flip-flop, an output serving as the output of the system clock domain latch, and a clock input coupled to the system clock signal.

25. The computer system according to claim 24, wherein the outputs of the process logic, the first flip-flop, the peripheral clock domain latch, the AND gate, and the system clock domain latch are initially in an opposite state than the reset signal before the reset signal is asserted.

26. The computer system according to claim 25, wherein the output of the process logic changes state in response to the reset signal being asserted.

27. The computer system according to claim 26, wherein the output of the process logic changes state to a first state in response to the reset signal being asserted, and changes state to a second state in response to the output of the system clock domain latch changing state from an initial state which it is in prior to the reset signal being asserted.

* * * * *